J. S. GREENE.
PHOTOGRAPHIC CAMERA.
APPLICATION FILED DEC. 19, 1918.
1,386,703.
Patented Aug. 9, 1921.
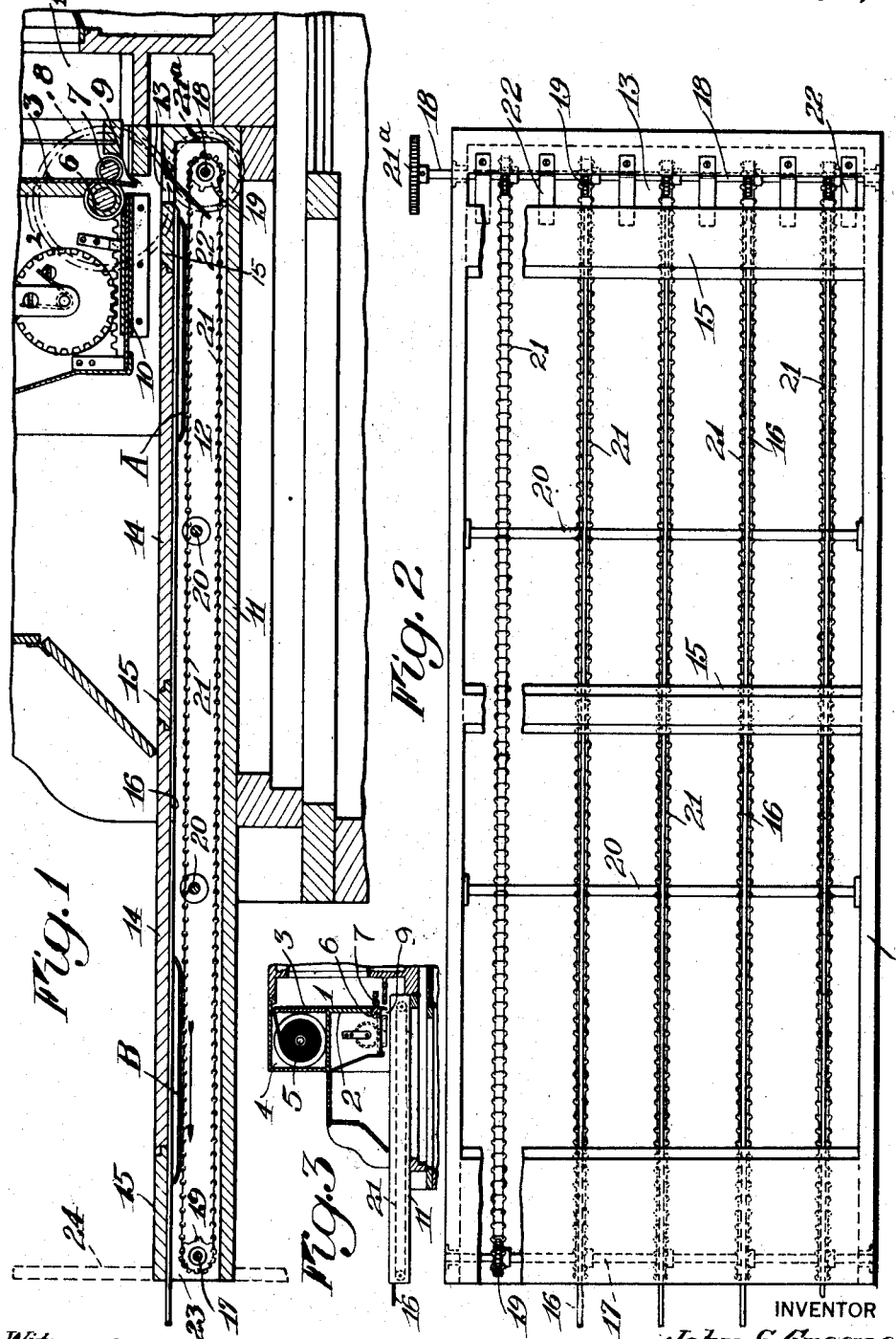
INVENTOR
John S. Greene
BY
his ATTORNEYS
Witnesses:
Nelson H. Copp

UNITED STATES PATENT OFFICE.

JOHN S. GREENE, OF ROCHESTER, NEW YORK, ASSIGNOR, TO PHOTOSTAT CORPORATION, OF PROVIDENCE, RHODE ISLAND, A CORPORATION OF RHODE ISLAND.

PHOTOGRAPHIC CAMERA.

1,386,703.  Specification of Letters Patent.  Patented Aug. 9, 1921.

Application filed December 19, 1918. Serial No. 267,455.

*To all whom it may concern:*

Be it known that I, JOHN S. GREENE, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and the reference-numerals marked thereon.

My present invention relates to photography and more particularly to photographic exposure and print handling devices of the kind commonly known as "Commercial cameras" and it has for its object to provide an improved apparatus of this character especially adapted to rapidly handle a large number of prints or photographs and to carry the exposed but undeveloped sheets away from the exposing chamber and deliver them at a more distant point as for instance, a dark-room. The improvements are also directed in part toward providing a means whereby the exposed sheets are delivered to the dark-room or other point in the same sequence in which they were exposed and to these and other ends the invention resides in certain improvements and combinations of parts all as will be hereinafter more fully described, the novel features being pointed out in the claims at the end of the specification.

In the drawings:

Figure 1 is an enlarged fragmentary longitudinal section through a camera constructed in accordance with and illustrating one embodiment of my invention.

Fig. 2 is a plan view of the dark chamber into which the exposed sheets are received, the covers being removed and portions of the top broken away and Fig. 3 is a reduced sectional view similar to Fig. 1 but showing the entire exposing chamber and roll-holder of the camera.

Similar reference numerals throughout the several views indicate the same parts.

In most cameras of the present type, film or sensitive paper is fed from a roll, exposed, severed and delivered into a developing apparatus for mechanical development. It is sometimes desired, however, to transport the exposed sheets in the dry state or with greater rapidity than immediate development permits of to a dark room. The present machine is designed for this latter purpose and is so constructed as to handle the sheets as rapidly as they can be exposed in the camera proper and in the exact order in which they are so exposed.

Referring first to Fig. 3, 1 indicates the exposure chamber of a camera and 2, the rear wall thereof which defines the focal plane and across which in a downward direction is fed the sensitive film 3. By "film" I, of course, mean to include the usual sensitive coated paper used in machines of this character. In rear of the wall 2 is a film chamber 4 containing a roll holder 5, from which the film is drawn as aforesaid by means of feed-rollers 6 and 7 at the base of the wall 2. One of the feed-rollers, in the present instance, the one marked 6, is provided with an exterior hand crank (not shown) and with a large gear 8, the latter for a purpose that will hereinafter appear.

After an area of film has been exposed in the focal plane, it is carried by the feed rollers 6 and 7 through a slot or passage 9 at the bottom of the camera and is then severed by a reciprocatory knife 10, operating just below the feed-rollers but the mechanism of which is not of interest herein.

Below the exposing portion or body of the camera I arrange a shallow dark-box or tray 11 constituting a dark chamber 12 that communicates with the delivery slot or passage 9 by means of a similar slot or passage 13 in its top at its forward end which passage 13 is directly below and in register with the passage 9. The top of this dark-box 11 consists, in the present instance, of two removable covers 14 resting upon transverse cleats 15 so that access may be gained when necessary to the interior and on the under side of the top are a plurality of spaced longitudinally extending bars 16 constituting smooth guides for contact with the film as hereinafter explained. The box is also provided at its two ends with transverse shafts 17 and 18 respectively having sprockets 19 spaced at intervals thereon. Over these sprockets are passed conveyer chains 21 that travel in the direction indicated by the arrow in Fig. 1. The upper stretches of these chains are held flat or in a horizontal plane and in a fixed path of travel by means of transverse intermediate bars or rollers 20 and the chains are driven at a speed in harmony with the film feeding mechanism by means of a gear 21ᵃ on shaft 18 at the front of the box which gear meshes with the large gear 8 on the shaft of the feed-roller 6.

The operation of the machine is as follows: When an exposed area of the film strip 3 is fed out of the exposure chamber 1 through the passages 9 and 13 it is received upon the conveyer chains 21 and passes between them and the guide rods 16, downwardly and rearwardly inclined guide fingers 22, between the chains adjacent the passage 13, being provided to give the print its direction. After being severed by the knife 10 the print is carried rearwardly a distance each time the film feeding devices are operated and it is held close against the conveyer chains on which it lies and which propel it by frictional contact because of the fact that the print has a tendency to curl and while the edges bear against the guide rods 16 the body portion of the sheet is flattened out against the conveyer chains so that this curling of the sheet due to its being wound on the roll-holder 5 is used to advantage in furthering the functions of the machine. Two of the sheets or prints are shown at A and B in Fig. 1. They finally arrive at the rear of the dark-box which is of any desired length and in the present instance I have shown an opening 23 at such rear end on the inside of a wall 24 shown in dotted lines in Fig. 1 and which may be considered as representing a wall of the dark-room.

I claim as my invention:

1. In a camera, the combination with an exposing chamber, means for feeding a continuous strip of film through the chamber and delivering it from the bottom thereof, and a severing device adapted to cut the delivered film into sheets, of a long, narrow dark chamber beneath the exposing chamber in to which the severed sheets are delivered and a conveyer within the dark chamber arranged to receive the sheets and carry them in a substantially straight path toward the end of the dark chamber in continuous contact with the wall thereof.

2. In a camera, the combination with an exposing chamber, means for feeding a continuous rolled strip of film through the chamber and delivering it from the bottom thereof, and a severing device adapted to cut the delivered film into sheets, of a long, narrow dark chamber beneath the exposing chamber, into which the severed sheets are delivered, and a conveyer within the dark chamber arranged to receive the sheets and to continuously coöperate with a wall of the chamber to carry them toward the end of the dark chamber in continuous contact with the wall thereof.

3. In a camera, the combination with a roll holder, an exposing chamber, means for feeding a continuous strip of film from the roll holder through the chamber and delivering it from the bottom thereof, and a severing device adapted to cut the delivered film into sheets, of a dark chamber beneath the exposing chamber into which the severed sheets are delivered and having guides at the top thereof, and a conveyer within the dark chamber arranged to receive the sheets and carry them toward the end of the dark chamber, said conveyer being in close proximity to the guides on the latter to permit the curled sheets to be pressed against it by the yielding contact of said sheets with the guide.

4. A dark chamber for handling cut photographic films comprising a dark box having an opening at one end through which the film sheets are received and a delivery opening at the opposite end and a conveyer arranged within the box to receive a sheet and to frictionally propel it to the delivery opening, the conveyer being arranged in proximity to a continuous guiding surface on the interior of the box so that a curled sheet will react against such surface and increase the frictional contact with the conveyer.

JOHN S. GREENE.